United States Patent [19]

Kellenbarger et al.

[11] Patent Number: 4,915,135
[45] Date of Patent: Apr. 10, 1990

[54] FLOW RESTRICTING HOSE ASSEMBLY

[75] Inventors: Harry G. Kellenbarger, Lincoln; Roy W. Olsen, Seward; Alfred H. Renard, Lincoln, all of Nebr.

[73] Assignee: The Goodyear Tire & Rubber Company, Akron, Ohio

[21] Appl. No.: 101,624

[22] Filed: Sep. 28, 1987

Related U.S. Application Data

[63] Continuation of Ser. No. 892,525, Jul. 31, 1986, abandoned.

[51] Int. Cl.$^4$ ............................................. F15D 1/02
[52] U.S. Cl. ........................................ 138/44; 138/40
[58] Field of Search ................... 138/37, 40, 44, 118, 138/41, 43, 109, 45; 285/138, 260, 345, 381, 382, 423, 260, 239; 29/450, 451, 157 C, 157.1; 239/533.13, 533.14; 403/282

[56] References Cited

U.S. PATENT DOCUMENTS

| | | | |
|---|---|---|---|
| 584,008 | 6/1897 | Munson | 285/239 |
| 1,873,590 | 8/1932 | James | 285/345 X |
| 2,107,350 | 2/1938 | Stubbins | 138/118 X |
| 2,322,877 | 6/1943 | Parker | 285/345 X |
| 2,335,591 | 11/1943 | Hansell | 285/138 X |
| 2,344,739 | 3/1944 | Shaff | 285/345 X |
| 2,363,592 | 11/1944 | Hunter | 285/260 X |
| 3,217,400 | 11/1965 | Illesy et al. | 285/260 |
| 3,554,580 | 1/1971 | Goyke | 285/260 |
| 4,285,534 | 8/1981 | Katayama et al. | 138/44 X |
| 4,324,112 | 4/1982 | Fujiwara et al. | 138/44 |

FOREIGN PATENT DOCUMENTS

| | | | |
|---|---|---|---|
| 240335 | 5/1965 | Austria | 138/44 |
| 4523 | of 1894 | United Kingdom | 285/345 |

Primary Examiner—Ernest G. Cusick
Assistant Examiner—Glenn T. Barrett
Attorney, Agent, or Firm—Marc R. Dion, Sr.

[57] ABSTRACT

A flow restricting hose assembly comprising a tubular conduit having a permanently expanded cylindrical portion proximate one end thereof and a cylindrical insert having a longitudinal perforation therethrough inserted into the expanded portion.

7 Claims, 1 Drawing Sheet

FLOW RESTRICTING HOSE ASSEMBLY

This is a continuation of application Ser. No. 892,525, filed on July 31, 1986, now abandoned.

FIELD OF THE INVENTION

This invention relates to the flow restricting devices. More particularly, it relates to a simplified, low cost flow restricting hose assembly.

BACKGROUND OF THE INVENTION

The structures of flow control devices are generally known in the fluid control art. An essential working part of such devices is a control element which is inexpensive to manufacture and simple to use. A known form of such a control element is a metal plate with an orifice therethrough. Such a device must be installed between two flanges to which a fluid conduit is attached. This requires extra labor as well as a multiplicity of parts involved. A somewhat simpler type of device is a metal or plastic cone with a hole at the apex of the cone. Such devices are generally pressed fitted into the flow conduit but unless restricted from movement by some external clamping means are subject to being forced down the conduit by the flow of the fluid therein.

It is, accordingly, one object of the invention disclosed herein to provide a flow restricting device having a minimum number of parts, particularly those external to the flow conduit at which point the system can develop leaks.

It is a further object of this invention, to provide a flow restricting device which is easily manufactured and assembled while reducing the weight of the assembly as compared to conventional restricting methods.

SUMMARY OF THE INVENTION

The anticipated difficulties with the prior art flow control devices may be overcome, and the objectives of the present invention may be attained by recourse to the invention herein disclosed which is a two piece flow restricting hose assembly comprising: (a) a one piece flexible tubular conduit having a length considerably greater than its diameter and having two ends and having a permanently expanded cylindrical portion therein proximate to one end thereof and (b) a cylindrical insert having a longitudinal aperture along its axis and having an outside diameter, and being coaxially disposed entirely within said expanded portion of said tubular conduit, wherein said expanded portion has an inner diameter which is slightly smaller than said outside diameter to provide a tight fit about said insert.

DETAILED DESCRIPTION OF THE DRAWINGS

Figure 1:
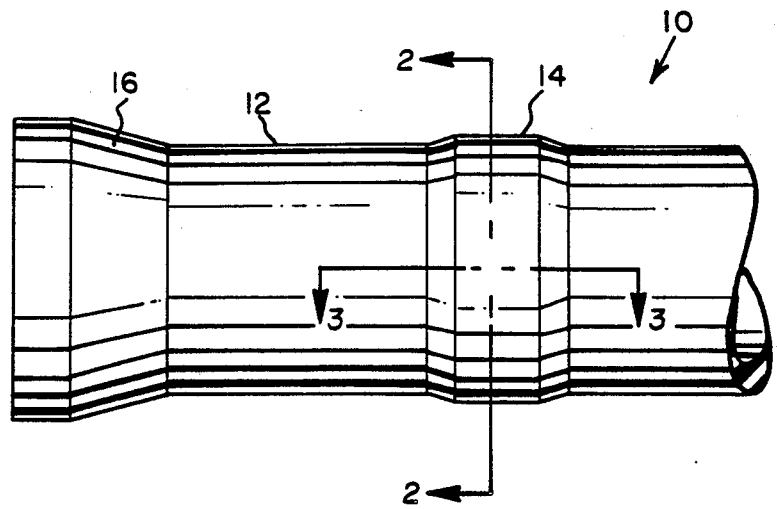
FIG. 1 is a side view of one end of the flexible tubular conduit or hose showing a bell-shaped end and an expanded portion proximate to the bell-shaped end.
Figure 2:
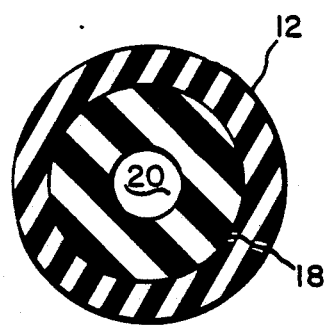
FIG. 2 is a radial cross section taken along lines 2—2 of FIG. 1.
Figure 3:
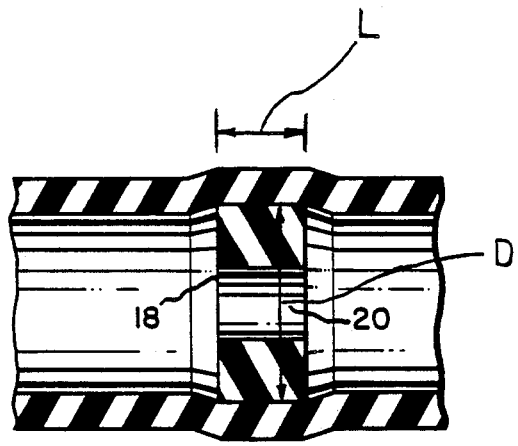
FIG. 3 is an axial cross section taken along lines 3—3 of FIG. 1.

The two piece flow restricting hose assembly shown generally at 10 is comprised of a one piece flexible tubular conduit 12 having a permanently expanded cylindrical portion 14 constructed in the flexible tubular conduit 12 at a location proximate to a bell-shaped end 16. Inserted into the permanently expanded cylindrical portion 14 is cylindrical insert 18 having a longitudinal aperture 20 therethrough. The inside diameter of the permanently expanded cylindrical portion 14 is such that it is slightly smaller than the outside diameter D of the cylindrical insert 18 in order to provide a tight fit between the insert and the expanded portion. The inside diameter of the outer portion of the bell-shaped end 16 is such that it is slightly larger than the outside diameter D of the cylindrical insert 18 to allow easy insertion of the insert through the bell-shaped end into the expanded portion 14. After the insert 18 is placed within the expanded cylindrical portion, the bell-shaped end can be trimmed off the hose.

The flexible tubular conduit or hose can be made from any material commonly used in the art which is compatible with the fluid to be contained. Generally, the material would be of an elastomeric type such as for example copolymers of acrylonitrile and butadiene, polychloroprene, organopolysiloxane or a terpolymer such as ethylene propylene diene. The flexible tubular conduit can also be made from thermoplastic materials. A preferred material is the terpolymer of ethylene propylene and diene. The conduit can also be suitably reinforced with such materials as viscose rayon, polyester, polyamide or aramid.

To provide for the permanently expanded cylindrical portion therein as well as for the bell-shaped end thereof, the flexible tubular conduit is constructed by extruding a tube, knitting a reinforcement layer onto the tube then extruding a cover over the reinforcement. Then the hose is placed on a mandrel having expanded portions at the points where the expansion and bell-shaped end are desired. The conduit is then vulcanized on the mandrel.

The cylindrical insert can be made from any one of a number of elastomeric materials which is compatible with the fluid flowing through the conduit. The material may be the same or different from the material of the conduit. The insert material should be compounded to provide a fairly rigid insert in order to preclude its flexing during use or its being dislodged from the expanded portion of the conduit. For instance, a cured insert should have at least a Shore A Durometer Hardness of 60, preferably at least 75 and most preferably at least 85. The methods of adjusting the hardness are commonly known to those skilled in the art.

The cylindrical insert can be manufactured by such methods as injection molding, transfer molding, compression molding or extruding followed by placing on a mandrel having an outside diameter which will provide the desired perforation. In the latter method, the extrusion is cured on the mandrel, removed therefrom and then sliced to the desired axial length. In order to prevent twisting of the insert as it is being installed into the conduit by pushing it in through the bell-shaped end and conduit into the permanently expanded cylindrical portion, it is preferred that the ratio of the axial length L of the insert to its diameter D be at least 0.6, preferably 0.75.

It will be appreciated that as an alternative method of manufacturing the flow restricting hose assembly, a cylindrical insert in its uncured state can be placed within a flexible tubular conduit having an inside diameter equal to or slightly smaller than the outside diameter of the insert or it can be temporarily restrained in place while it is subsequently vulcanized or cured. The uncured cylindrical insert can also be placed in an expanded cylindrical portion of a tubular conduit such as described above and subsequently cured in place. In such instances, the Shore A Durometer Hardness of the insert need only be a minimum of about 45. While this method of manufacture may be somewhat more complicated than the preferred mode hereinbefore described, it provides an integral flow restricting hose assembly which overcomes the disadvantages of prior art devices stated above.

The two piece flow restricting hose assembly of the present invention can find utility wherever it is described to control the flow of a fluid. A particularly useful application is as a water heater supply hose in the engine compartment of an automobile where it is desirable to restrict the flow of hot coolant to the heat exchanger coil in order to prevent the discomforting sound audible within the passenger compartment which has come to be known as "heater moaning".

While certain representative embodiments and details have been shown for the purpose of illustrating the invention, it will be apparent to those skilled in this art that various changes and modifications may be made therein without departing from the scope of the invention.

What is claimed is:

1. A two piece flow restricting hose assembly comprising:

(a) a one piece flexible tubular conduit having a length considerably greater than its diameter and having two ends and having a permanently expanded cylindrical portion therein proximate to one end thereof and
   (b) a cylindrical insert having a longitudinal aperture along its axis and having an outside diameter and being coaxially disposed entirely within said expanded portion of said tubular conduit, wherein said expanded portion has an inner diameter which is slightly smaller than said outside diameter to provide a tight fit about said insert.

2. The assembly according to claim 1 wherein the flexible tubular conduit is comprised of a terpolymer of ethylene, propylene and a diene.

3. The assembly according to claim 1 wherein the cylindrical insert has a Shore A Durometer Hardness of at least 60.

4. The assembly according to claim 3 wherein the cylindrical insert has a Shore A Durometer Hardness of at least 75.

5. The assembly according to claim 4 wherein the cylindrical insert has a Shore A Durometer Hardness of at least 85.

6. The assembly according to claim 1 wherein the ratio of the axial length of the cylindrical insert to its outside diameter is at least 0.6.

7. The assembly according to claim 6 wherein the ratio of the axial length of the cylindrical insert to its outside diameter is at least 0.75.

* * * * *